(12) United States Patent
Murai et al.

(10) Patent No.: US 9,676,912 B2
(45) Date of Patent: Jun. 13, 2017

(54) MARKING BASE COMPOSITION AND MARKING BASE USING THE SAME

(71) Applicant: NGK Insulators, Ltd., Nagoya (JP)

(72) Inventors: Makoto Murai, Nagoya (JP); Akifumi Nishio, Nagoya (JP); Yasumasa Fujioka, Nagoya (JP); Masanari Iwade, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 343 days.

(21) Appl. No.: 14/509,186

(22) Filed: Oct. 8, 2014

(65) Prior Publication Data

US 2015/0024190 A1 Jan. 22, 2015

Related U.S. Application Data (63) Continuation of application No. PCT/JP2014/057857, filed on Mar. 20, 2014.

(30) Foreign Application Priority Data

Mar. 27, 2013 (JP) ................................ 2013-067142

(51) Int. Cl.

| | | |
|---|---|---|
| *C08J 5/18* | (2006.01) | |
| *C08J 9/00* | (2006.01) | |
| *C08J 9/228* | (2006.01) | |
| *C09D 5/00* | (2006.01) | |
| *C09D 11/10* | (2014.01) | |

(Continued)

(52) U.S. Cl.
CPC ............... *C08J 5/18* (2013.01); *B41M 5/267* (2013.01); *B41M 5/52* (2013.01); *C08J 9/0066* (2013.01); *C08J 9/228* (2013.01); *C09D 5/00* (2013.01); *C09D 7/1216* (2013.01); *C09D 11/037* (2013.01); *C09D 11/10* (2013.01);
(Continued)

(58) Field of Classification Search
None
See application file for complete search history.

(56) References Cited

U.S. PATENT DOCUMENTS 5,759,672 A * 6/1998 Fujii .................... G03G 7/0006
 427/210
5,792,807 A   8/1998 Hayashihara et al.
(Continued)

FOREIGN PATENT DOCUMENTS

CN     101111391 A    1/2008
CN     101784620 A    7/2010
(Continued)

OTHER PUBLICATIONS

Chinese Office Action (Application No. 201480001000.1) dated Feb. 29, 2016.
(Continued)

*Primary Examiner* — David Sample
*Assistant Examiner* — Donald M Flores, Jr.
(74) *Attorney, Agent, or Firm* — Burr & Brown, PLLC (57) ABSTRACT

To provide a technique related to a marking base that allows clear marking by ink and is excellent in thermal resistance and chemical resistance. A marking base composition contains inorganic particles of 27 to 50 mass %, an inorganic binder of 5 to 20 mass %, an organic binder of 3 to 16 mass %, a thermal expansion resin of 1 to 3 mass %, and an organic solvent.

8 Claims, 3 Drawing Sheets

(51) Int. Cl.
- *C09D 7/12* (2006.01)
- *B41M 5/26* (2006.01)
- *B41M 5/52* (2006.01)
- *C09D 11/037* (2014.01)
- *B41M 5/28* (2006.01)

(52) U.S. Cl.
CPC ............ *B41M 5/28* (2013.01); *B41M 5/5218* (2013.01); *C08J 2357/00* (2013.01); *C08J 2400/00* (2013.01)

(56) References Cited

U.S. PATENT DOCUMENTS

| | | | | |
|---|---|---|---|---|
| 5,851,655 | A | * | 12/1998 | Tokiyoshi ............... B41M 5/52 428/195.1 |
| 5,908,723 | A | * | 6/1999 | Malhotra ............... B41M 5/52 347/105 |
| 5,928,842 | A | | 7/1999 | Shinmoto et al. |
| 7,824,030 | B2 | * | 11/2010 | Laney .................... B41M 5/50 156/229 |
| 2005/0069671 | A1 | * | 3/2005 | Matsubaguchi ......... B41M 5/52 428/64.4 |
| 2006/0065161 | A1 | * | 3/2006 | Miller .................... B41M 5/52 106/400 |
| 2007/0054070 | A1 | | 3/2007 | Laney et al. |
| 2007/0098492 | A1 | | 5/2007 | Nagaoka |
| 2008/0008896 | A1 | | 1/2008 | Shinohara et al. |
| 2008/0280064 | A1 | | 11/2008 | Tokunaga et al. |
| 2010/0233447 | A1 | | 9/2010 | Campbell et al. |
| 2010/0239642 | A1 | | 9/2010 | Campbell et al. |
| 2010/0310787 | A1 | | 12/2010 | Lehmann et al. |
| 2011/0024667 | A1 | | 2/2011 | Mamak et al. |
| 2011/0065576 | A1 | | 3/2011 | Campbell et al. |

FOREIGN PATENT DOCUMENTS

| | | |
|---|---|---|
| CN | 101831215 A | 9/2010 |
| JP | 05-025317 A1 | 2/1993 |
| JP | 06-048042 A1 | 2/1994 |
| JP | 10-237319 | 9/1998 |
| JP | 2002-283729 AI | 10/2002 |
| JP | 2004-027238 A1 | 1/2004 |
| JP | 2009-505864 A1 | 2/2009 |
| WO | 2007/024474 A1 | 3/2007 |
| WO | 2007/072694 A1 | 6/2007 |

OTHER PUBLICATIONS

International Search Report and Written Opinion (Application No. PCT/JP2014/057857) dated Jun. 17, 2014.

* cited by examiner

MARKING BASE COMPOSITION AND MARKING BASE USING THE SAME

BACKGROUND OF THE INVENTION

1. Field of the Invention

The present invention relates to a marking base composition for displaying (marking) with ink and a marking base using the marking base composition.

2. Description of Related Art

To identify a product, a display such as a product name, a product number, a barcode, and a QR code (registered trademark) (two-dimensional code) is sometimes marked on the product. When the product is marked, from a perspective of ensuring clearer and inerasable marking, widely, a marking base is coated on the surface of the product and a display is shown on this marking base.

As a product using the marking base, there is a catalyst carrier of a honeycomb structure (hereinafter referred to as a "honeycomb catalyst carrier"). The honeycomb catalyst carrier generally displays information such as a product history, a size, and a physical property for the individual products. Furthermore, also in the phase of a honeycomb catalytic body after the process for loading the catalyst, information related to the catalyst might be written on the marking base. For investigation when a trouble occurs on the honeycomb catalyst carrier or the honeycomb catalytic body or investigation when a breakdown occurs on a vehicle and the like on which the honeycomb catalytic body is mounted, these various pieces of information are preferred to be maintained in the state readable even in the process of the usage of this type of vehicle and the like. The methods for marking are roughly divided into a method with ink and a method with laser irradiation.

For marking with ink, a marking base for ink has been proposed. As a representative, a marking base for ink made of a porous resin sheet has been proposed (in Patent Document 1). In this marking base for ink, the porous resin sheet absorbs ink so as to achieve satisfactory adherability of the ink. Additionally, the porous resin sheet promptly absorbs ink so as to reduce accumulation of the ink on the surface of the marking base. As a result, this allows reduction of ink bleed and ink removal when the base surface is rubbed. The marking base for ink is typically made of polymer and thus does not have thermal resistance. In the case where the base is applied to the honeycomb catalyst carrier, the marking base cannot withstand the process for loading the catalyst. Taking into consideration the circumstances, it is possible to apply the marking base made of the porous resin sheet to the honeycomb catalytic body after the catalyst is loaded rather than the honeycomb catalyst carrier before the process for loading the catalyst. However, in the process of the usage of the vehicle, the honeycomb catalytic body is exposed to a high temperature. Therefore, it is difficult to maintain the marked information using the base without thermal resistance.

On the other hand, as the base (the marking base for laser) for display with laser irradiation, a base made of resin, an organic pigment, aluminum hydroxide, and the like has been proposed (in Patent Document 2). In this marking base for laser, the resin is etched by laser irradiation and marking is performed. Furthermore, as the marking base for laser, a marking base made of an inorganic material such as an inorganic pigment and titanium-based ceramic resin (an inorganic marking base for laser) has also been proposed (in Patent Document 3). This inorganic marking base for laser is made of an inorganic material, thus being excellent in thermal resistance and chemical resistance. These marking bases for laser have the advantage that the display is less likely to disappear since the marking base itself is discolored. For example, for the honeycomb catalyst carrier described above, the inorganic marking base for laser excellent in thermal resistance is preferred to be used. This is because using the inorganic marking base for laser allows marking even after the catalyst is loaded. With the inorganic marking base for laser, since the base itself is etched for marking, the display is less likely to disappear even in the case where the base surface is rubbed when the honeycomb catalytic body is mounted on the vehicle to be used.

The marking base for laser has the above-described advantage but does not suit for general use because of necessity of a laser irradiation device. For example, for the honeycomb catalyst carrier, the manufacturer of the honeycomb catalyst carrier is different from the manufacturer that loads the catalyst onto the honeycomb catalyst carrier. In the case where a plurality of manufacturers is involved, not all of the manufacturers can use the laser irradiation device. Thus, the marking base is preferred to have high versatility to allow marking with ink other than the laser irradiation device.

A general marking base for laser is not appropriate for marking with ink. In particular, an inorganic marking base for laser has a dense structure. Accordingly, when marking (for example, ink jet printing) with ink on the marking base for laser is attempted, the ink has difficulty in soaking into the base. Additionally, ink is repelled by the base surface and the ink is not fixed. Furthermore, after heat treatment is performed in the process for loading the catalyst and the like, the surface of the base becomes thermally shrinked. Accordingly, the ink is more likely to be repelled by the base surface. Additionally, performing heat treatment on the inorganic marking base for laser causes formation of cracking in the base due to thermal expansion and contraction. This causes spread of the ink along the cracking, thus causing ink bleed as a result.

CITATION LIST

Patent Documents

Patent Document 1: JP-A-2009-505864
Patent Document 2: JP-A-5-25317
Patent Document 3: WO2007/072694

SUMMARY OF THE INVENTION

Problem to be Solved by the Invention

The marking base on the honeycomb catalyst carrier requires to allow writing information when the carrier is completed. Furthermore, the marking base on the honeycomb catalyst carrier requires to allow writing information also after the catalyst is loaded. In particular, the information written after the catalyst is loaded requires to be maintained during traveling of the vehicle on which the honeycomb catalytic body is mounted. Since the manufacturer of the carrier and the manufacturer of the catalyst are different from each other, the marking base on the honeycomb catalyst carrier is required to be adaptable to various writing methods, at least both of marking with ink and marking with laser irradiation.

However, in the marking base for ink described above, performing heat treatment denatures the porous resin sheet. As a result, the function as the marking base is ruined.

Accordingly, the marking base for ink described above does not suit for, for example, the product on which reading is performed after the heat treatment or the product on which printing is performed after the heat treatment like the honeycomb catalyst carrier. Therefore, to increase the thermal resistance, there is a possible device for making the porous marking base with an inorganic material. However, in this inorganic porous marking base, ink floating on the base surface still occurs. Thus, regarding the marking base for ink, the appearance of a product that is excellent in thermal resistance and suitable for practical use is strongly required.

The present invention has been developed in view of the above-mentioned problems, and an its object is to provide a technique related to a marking base that allows clear marking with ink and is excellent in thermal resistance and chemical resistance.

Means for Solving the Problem

The present invention is the marking base composition and the marking base using this marking base composition as follows.

According to a first aspect of the present invention, a marking base composition contains: inorganic particles of 27 to 50 mass %; an inorganic binder of 5 to 20 mass %; an organic binder of 3 to 16 mass %; a thermal expansion resin of 1 to 3 mass %; and an organic solvent.

According to a second aspect of the present invention, in the marking base composition according to the first aspect described above, the thermal expansion resin is a foamable resin in an unfoamed state.

According to a third aspect of the present invention, in the marking base composition according to the first or second aspects described above, the inorganic particle includes inorganic particles for laser color development of 12 to 25 mass % (note that in a case where an entire marking base composition is 100 mass %).

According to a fourth aspect of the present invention, the marking base composition according to any of the first to third aspects described above further includes a thickening material of 0.5 to 1.0 mass %.

According to a fifth aspect of the present invention, a marking base is obtained by: forming the marking base composition according to any of the first to fourth aspects described above in a sheet formation; and performing heat treatment at 300 to 800° C. for 2 seconds to 30 minutes.

According to a sixth aspect of the present invention, a marking base includes: inorganic particles of 27 to 50 mass % containing at least one kind of mica, silica, talc, and kaolin; and an inorganic binder of 15 to 25 mass %. The inorganic particles are combined together via the inorganic binder. An average diameter of an open pore on a base surface is 15 to 26 μm and a pore area ratio is 8 to 16%.

According to a seventh aspect of the present invention, in the marking base according to the sixth aspect described above, the inorganic particle includes inorganic particles for laser color development of 32 to 46 mass % (note that in a case where a marking base is 100 mass %).

According to an eighth aspect of the present invention, the marking base according to any of the fifth to seventh aspects described above, a thickness of the marking base is 10 to 100 μm.

Effect of the Invention

According to the marking base composition of the present invention, application over an object and drying with heat treatment allow formation of an inorganic porous marking base. The porous structure of the marking base is shaped by forming cavities due to the thermal expansion resin and the organic binder being burnt out during heat treatment (drying). In particular, according to the marking base composition of the present invention, the thermal expansion resin is burnt out while expanding by heat treatment. Thus, countless bubble-like pores are formed. Additionally, according to the marking base composition of the present invention, simultaneously with the formation of the countless bubble-like pores, burning out of the organic binder causes formation of the capillary-like pore that causes the bubble-like pores to communicate with one another.

The marking base of the present invention thus obtained mainly contains the inorganic component, thus being excellent in thermal resistance and chemical resistance. That is, the marking base of the present invention maintains a display even placed under high temperature after marking with ink and allows marking with ink even after heat treatment.

According to the marking base of the present invention, ink soaks into the inner portion of the base through the capillary-like pore. Furthermore, the soaked ink is appropriately accumulated within the bubble-like pore in the base superficial portion. These soaking of the ink into the inner portion of the base and accumulation of the ink within the pore make the display less likely to disappear even when the base surface is rubbed and allow reducing ink floating and decolorization of the ink. Additionally, with the marking base of the present invention, the bubble-like pore and the capillary-like pore reduce occurrence of cracking and extension of cracking. This allows reducing ink bleed due to cracking.

That is, the marking base composition of the present invention and the marking base using this marking base composition are excellent in thermal resistance and chemical resistance and allow clear marking with ink.

DETAILED DESCRIPTION OF THE INVENTION

Hereinafter, embodiments of the present invention will be described with reference to the drawings. The present invention is not limited to the following embodiments, and changes, modifications and improvements can be added to the embodiments without departing from the gist of the present invention.

A marking base composition of the present invention contains inorganic particles of 27 to 50 mass %, an inorganic binder of 5 to 20 mass %, an organic binder of 3 to 16 mass %, a thermal expansion resin of 1 to 3 mass %, and an organic solvent. Note that the content (mass %) here is a value in the case where the entire marking base composition is 100 mass % (hereinafter, unless otherwise stated, mass % of the entire marking base composition is 100 mass %). Using the marking base composition of the present invention allows forming an inorganic porous marking base that has a structure in which the countless bubble-like pores communicate with one another by capillary-like pores.

The inorganic particle used for the marking base composition of the present invention includes inorganic particles that functions to shape the frame of the porous structure of the base. The "inorganic particle for shaping the frame" can employ kaolin, mica, talc, silica, and the like. Only one kind of or two or more kinds of the "inorganic particle for shaping the frame" may be used.

The inorganic particles used for the marking base composition of the present invention may include "inorganic particles for laser color development" as necessary. The "inorganic particle for laser color development" functions to develop color with laser irradiation. As one example, the "inorganic particle for laser color development" has a property in which the inorganic particle is irradiated with laser to aggregate and loses the diffuse reflectivity so as to develop a color. The "inorganic particle for laser color development" that can be used for the marking base composition of the present invention can employ titania, zirconia, alumina, silicon carbide, silicon, aluminum nitride, and the like. For example, titania shows black by laser irradiation. Here, the "inorganic particle for laser color development" is always used in combination with the "inorganic particle for shaping the frame."

Various inorganic particles as the "inorganic particle for shaping the frame" described above and various inorganic particles as the "inorganic particle for laser color development" may be used as the combination of only one kind of each inorganic particle, may be used as the combination of one kind of one inorganic particle and two or more kinds of the other inorganic particle, or may be used as the combination of two or more kinds of each inorganic particle. For example, these inorganic particles may be used as the combination of two kinds of inorganic particles as the "inorganic particle for shaping the frame" and one kind of inorganic particle as the "inorganic particle for laser color development."

In the marking base composition of the present invention, from the aspect of an excellent combination of marking with ink and marking with laser irradiation, it is preferred to contain inorganic particles for laser color development of 12 to 25 mass % (note that in the case where the entire marking base composition is 100 mass %).

In the marking base composition of the present invention, the content of the inorganic particle is ordinarily 27 to 50 mass %. In the marking base composition of the present invention, in the case where the content of the inorganic particle is 27 mass % or more, the porous structure can be shaped at a sufficient aggregate amount. Consequently, according to the marking base composition of the present invention, the shape keeping property of the porous structure of the marking base can be increased. In the marking base composition of the present invention, in the case where the content of the inorganic particle is 50 mass % or less, the porous structure appropriate for soaking of ink and accumulation of ink can be shaped. As a result, the marking base composition of the present invention allows clear marking with ink.

Furthermore, in the marking base composition of the present invention, from the aspect of further improving the shape keeping property of the porous structure of the marking base and the clear marking with ink, the content of the inorganic particle is preferred to be 35 to 45 mass %, in particular, more preferred to be 37 to 40 mass %.

In the inorganic particle used for the marking base composition of the present invention, in the case where the inorganic particle for laser color development is contained, the average particle diameter of the "inorganic particle for laser color development" is preferred to be 0.2 to 2.0 µm and the average particle diameter of the "inorganic particle for shaping the frame" is preferred to be 3 to 10 µm. Setting the average particle diameters of the "inorganic particle for laser color development" and the "inorganic particle for shaping the frame" as described above allows causing a proper chromogenic property by laser irradiation. Furthermore, the average particle diameter of the "inorganic particle for laser color development" is preferred to be 0.2 to 1.0 µm and the average particle diameter of the "inorganic particle for shaping the frame" is preferred to be 4 to 6 µm.

The "average particle diameter" in this description is the average particle diameter measured by particle diameter distribution measurement on volumetric basis by a laser diffraction scattering method. For example, this average particle diameter can be measured with a laser diffraction/scattering particle size distribution analyzer "LA-920 (which is a product name)" made by HORIBA, Ltd.

The inorganic binder used for the marking base composition of the present invention functions to contribute to formation of the porous structure of the base so as to give thermal resistance to the base and contribute to the adhesion property with an object during application over the object. The inorganic binder used for the marking base composition of the present invention can employ a titanium-based ceramic resin, a silicon resin, and the like. Regarding the various inorganic binders described here, only one kind may be used or a combination of two or more kinds may be used.

In the marking base composition of the present invention, the content of the inorganic binder is ordinarily 5 to 20 mass %. In the marking base composition of the present invention, in the case where the content of the inorganic binder is 5 mass % or more, the thermal resistance and the adhesion property with the object of the obtained marking base can become sufficient. In the marking base composition of the present invention, in the case where the content of the inorganic binder is 20 mass % or less, a sufficient amount of the pore can be formed in the obtained marking base.

Furthermore, in the marking base composition of the present invention, from the aspect of further increasing the thermal resistance and the adhesion property of the marking base and realizing formation of an appropriate pore and shape keeping of the pore, the content of the inorganic binder is preferred to be 15 to 20 mass %. Furthermore, in the marking base composition of the present invention, the content of the inorganic binder is more preferred to be 15 to 17 mass %.

As described above, the organic binder of the marking base composition of the present invention functions to contribute to formation of a capillary-like pore (hereinafter referred to as the "communication pore"). The organic binder used for the marking base composition of the present invention can employ, for example, an acrylic resin.

In the marking base composition of the present invention, the content of the organic binder is ordinarily 3 to 16 mass %. In the marking base composition of the present invention, in the case where the content of the organic binder is 3 mass % or more, the communication pore can be sufficiently formed in the obtained marking base. In the marking base composition of the present invention, in the case where the content of the organic binder is 16 mass % or less, this allows reducing the situation where the catalyst leaks to the surface of the marking base when the object is a porous catalyst carrier. For the "porous catalyst carrier," see a "honeycomb catalyst carrier 40" described later.

Furthermore, in the marking base composition of the present invention, from the aspect of ensuring formation of a sufficient amount of the communication pore and reliably reducing leakage of the catalyst described above, the content of the organic binder is preferred to be 4 to 15 mass %, in particular, more preferred to be 4 to 8 mass %.

The thermal expansion resin used for the marking base composition of the present invention functions to contribute to formation of a bubble-like pore as described above. The thermal expansion resin in this description means a resin that has a property in which performing heat treatment at 100 to 200° C. causes a 10 to 50-fold increase in volume and the resin is burnt out at 200° C. or more.

In the marking base composition of the present invention, in order to allow clear marking with ink when heat treatment is performed to form the marking base, the average particle diameter of the thermal expansion resin is preferred to be 5 to 25 μm, further, more preferred to be 5 to 14 μm.

The thermal expansion resin used for the marking base composition of the present invention can employ a foamable resin in an unfoamed state. In order to allow clear marking with ink when heat treatment is performed to form the marking base, the thermal expansion resin is appropriate for forming a bubble-like pore having appropriate size and amount and for forming a capillary-like pore that causes the bubble-like pores to communicate with one another inside of the marking base. Especially, in the case where the foamable resin in the unfoamed state is used, a preferred pore structure is formed in the process where the resin is foamed by heat treatment and the generated gas escapes.

Here, a possible material of the foamable resin in the unfoamed state used for the marking base composition of the present invention can employ, for example, polyvinylidene chloride, polypropylene, polyethylene resin, and the like.

In the marking base composition of the present invention, the content of the thermal expansion resin is ordinarily 1 to 3 mass %. In the marking base composition of the present invention, in the case where the content of the thermal expansion resin is 1 mass % or more, the bubble-like pore can be sufficiently formed in the obtained marking base. In the marking base composition of the present invention, in the case where the content of the thermal expansion resin is 3 mass % or less, this allows reducing the situation where the catalyst leaks to the surface of the marking base when the object is a porous catalyst carrier.

Furthermore, in the marking base composition of the present invention, from the aspect of ensuring formation of a sufficient amount of bubble-like pore and reliably reducing leakage of the catalyst described above, the content of the thermal expansion resin is ordinarily 1 to 3 mass %, further, preferred to be 1.5 to 2.5 mass %.

For the organic solvent used for the marking base composition of the present invention, giving fluidity to the marking base composition causes proper mixing of the inorganic particle, the inorganic binder, the organic binder, and the thermal expansion resin described above. The organic solvent used for the marking base composition of the present invention functions to cause the marking base composition to be in the state appropriate for application over the object.

The organic solvent used for the marking base composition of the present invention can employ xylene, butanol, ethylbenzene, toluene, and the like. Regarding the various organic solvents described here, only one kind may be used or a combination of two or more kinds may be used.

In the marking base composition of the present invention, from the aspect of increasing the viscosity for ease of application over the object, it is preferred to include a thickening material of 0.5 to 1.0 mass %. The thickening material that can be used for the marking base composition of the present invention can employ polyethylene, fatty acid amide, and the like.

The marking base composition of the present invention can be superficially applied over the surface of the object and subjected to heat treatment at 300 to 800° C. for 2 seconds to 30 minutes so as to allow disposing the marking base on the surface of the object. Performing the heat treatment causes volatilization of the organic solvent to dry the base and causes the thermal expansion resin and the organic binder to be burnt out as described above, so as to form a pore inside of the marking base. The expression "superficially applied over" in this description means formation of a film or a thin layer of the marking base composition on the surface of the object.

Figure 1:
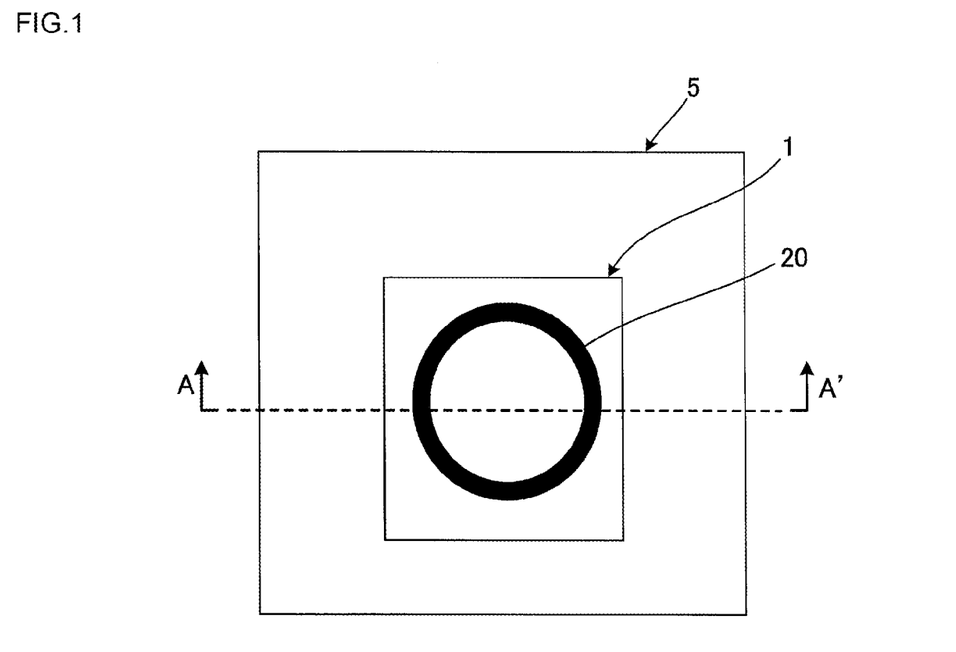
FIG. 1 is a schematic explanatory diagram of an embodiment of a marking base of the present invention.

FIG. 1 is a schematic explanatory diagram illustrating the state where a marking base of one embodiment of the present invention is disposed on the surface of the object. FIG. 1 illustrates the state where a marking base 1 of the one embodiment of the present invention is disposed on the surface of an object 5 and a circle mark is printed with an ink 20 on the marking base 1.

Figure 2:
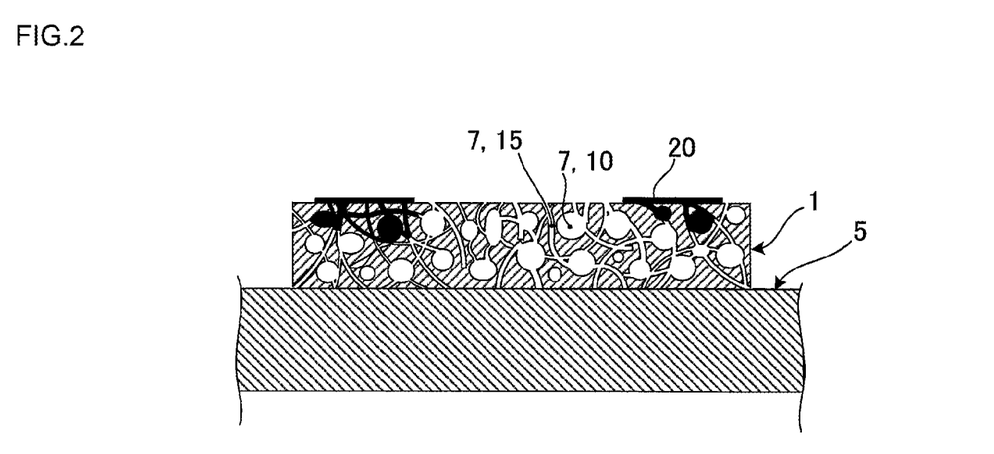
FIG. 2 is a schematic diagram of the A-A' cross section in FIG. 1.

FIG. 2 is a schematic diagram of the A-A' cross section in FIG. 1. As illustrated in the drawing, the marking base 1 of this embodiment includes a porous structure having countless pores 7. In the marking base 1 of this embodiment, the pores 7 include a bubble-like pore 10 and a capillary-like pore (a communication pore 15) that causes the bubble-like pores 10 to communicate with one another. The capillary-like pore (the communication pore 15) has a smaller hole diameter than that of the bubble-like pore 10.

As illustrated in the drawing, the ink 20 is put on the surface of the marking base 1 of this embodiment, the ink 20 soaks into the pore 7. Thus, the condition that the ink 20 soaks into the pore 7 allows reducing accumulation of an excessive amount of the ink 20 on the surface of the marking base 1. That is, the marking base 1 of this embodiment allows reducing ink floating.

At this time, with a capillary action, the ink 20 is suctioned into the capillary-like pore (the communication pore 15). The ink 20 thus absorbed is accumulated within the bubble-like pore 10 that is present in the superficial portion of the marking base 1. Thus, the ink 20 is accumulated within the bubble-like pore 10 in the superficial portion. Accordingly, the display with the ink 20 is less likely to disappear even when the surface of the marking base 1 is rubbed.

In the marking base 1 of this embodiment, in the case where a stress caused by thermal expansion and the like is generated on the marking base 1, the porous structure that includes the bubble-like pore 10 and the capillary-like pore (the communication pore 15) functions as a cushion. Specifically, a small variation in hole diameter of the bubble-like pore 10 or the communication pore 15 allows reducing the stress and reducing the occurrence of cracking. Especially, the marking base 1 of this embodiment has the structure where the bubble-like pores 10 are communicated with one another by the communication pore 15. Thus, a small variation in hole diameter of the bubble-like pore 10 or the communication pore 15 is likely to occur and a soothing effect on the stress tends to be high. This is preferred.

In the marking base 1 of this embodiment, the countless pores 7 are formed. Thus, even if cracking occurs, the cracking immediately intersects with the pores 7. This reduces extension of cracking. Thus, the marking base 1 of this embodiment allows reducing ink bleed due to cracking.

That is, the marking base 1 of this embodiment maintains the porous structure even after heat treatment and further reduces occurrence of cracking and extension of cracking. This allows marking with ink after heat treatment. Accordingly, the marking base 1 of this embodiment is appropriate to be used for a product supposed to be subjected to marking after heat treatment and to be used under high temperature like the honeycomb catalyst carrier.

The marking base 1 of this embodiment includes a structure where inorganic particles (derived from the inorganic particle contained in the marking base composition) are combined via inorganic binders (derived from the inorganic binder contained in the marking base composition). Furthermore, the marking base 1 of this embodiment includes: the inorganic particle of 27 to 50 mass % including at least one kind of mica, silica, talc, and kaolin; and the inorganic binder of 15 to 25 mass %. The average diameter of the open pore of the base surface is 15 to 26 μm. The pore area ratio is 8 to 16%.

In the case where the average diameter of the open pore of the marking base 1 is less than 15 μm or the pore area ratio is less than 8%, ink is easily repelled. In the case where the average diameter of the open pore of the marking base 1 is more than 26 μm or the pore area ratio is more than 16%, ink easily bleeds.

In this description, the "average diameter of the open pore" is the value of the diameter of the circle having the area equal to the area of an open pore by performing shape analysis from an electron micrograph of the base surface in a visual filed of 0.1 $mm^2$ or more and binarizing so as to measure the area of the pore.

In this description, the "pore area ratio" means the proportion (on percentage) of the area occupied by the pore having the open pore diameter of 4 μm or more on the base surface (the sum of the area of the open pore having the pore diameter of 4 μm or more on the base surface/the area of the base surface×100).

The inorganic particle included in the marking base 1 of this embodiment always includes inorganic particles contained in the above-described marking base composition, in particular, inorganic particles derived from the "inorganic particle for shaping the frame", thus including at least one kind of mica, silica, talc, and kaolin. In particular, in the marking base 1 of this embodiment, the inorganic particle included in the marking base 1 is preferred to include at least one or more kinds of mica, silica, talc, and kaolin. Thus, in the case where the inorganic particle includes at least one or more kinds of mica, silica, talc, and kaolin, the porous structure of the marking base 1 is likely to be maintained.

In the marking base 1 of this embodiment, the content of the inorganic particle including at least one kind of mica, silica, talc, and kaolin is ordinarily 27 to 50 mass % (here, the marking base is set to 100 mass %). Thus, in the case where the content of the inorganic particle is 27 mass % or more, the porous structure can be maintained even when heat treatment is performed. On the other hand, in the case where the content of the inorganic particle is 50 mass % or less, the content of the inorganic binder becomes relatively sufficient. This increases the adhesion property between the marking base 1 and the object. In particular, in the marking base 1 of this embodiment, the inorganic particle included in the marking base 1 is preferred to include at least one or more kinds of mica, silica, talc, and kaolin and the content of the inorganic particle is preferred to be 27 to 50 mass % (here, the marking base is set to be 100 mass %).

Furthermore, in the marking base 1 of this embodiment, in order to form a porous structure, mica, silica, talc, and kaolin included as the inorganic particle in the marking base 1 are preferred to have an average particle diameter of 3 to 10 μm, more preferably, 4 to 6 μm.

In the marking base 1 of this embodiment, in order to allow clear marking with laser irradiation, the inorganic particle is preferred to include the above-described "inorganic particle for laser color development" of 32 to 46 mass (here, in the case where the marking base 1 is set to 100 mass %.

The marking base 1 of this embodiment includes the inorganic binder of 15 to 25 mass % (here, the marking base is set to 100 mass %). Thus, in the case where the inorganic binder of 15 to 25 mass % is included, the thermal resistance and the adhesion property of the marking base are further increased and the pore is likely to be in an appropriate size and an appropriate communication state.

In the marking base 1 of this embodiment, in order to give satisfactory durability, the thickness is preferred to be 10 to 100 μm. Furthermore, the thickness of the marking base 1 is more preferred to be 10 to 50 μm, in particular, most preferred to be 10 to 30 μm.

Figure 3:
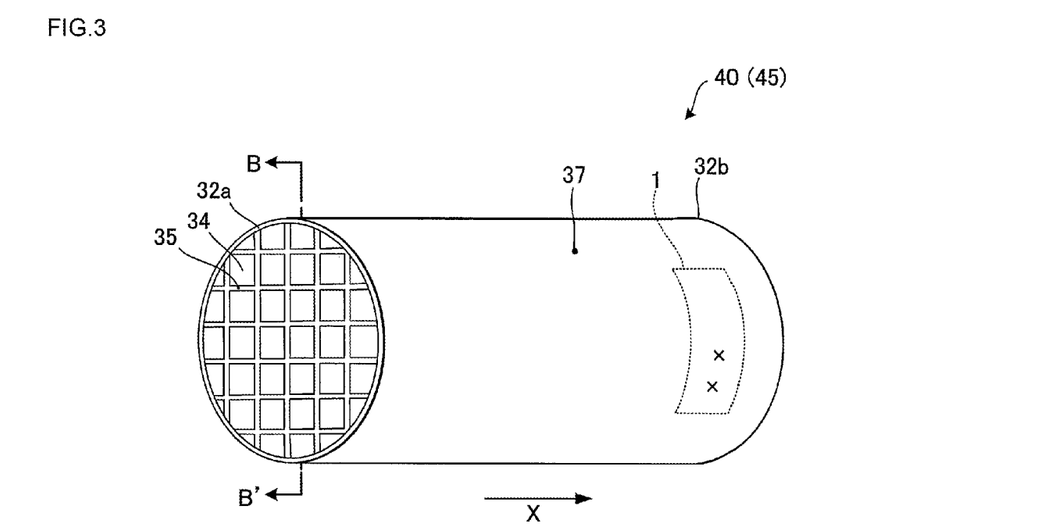
FIG. 3 is a schematic perspective view of a honeycomb catalyst carrier that includes the marking base of the an embodiment of the present invention.
Figure 4:
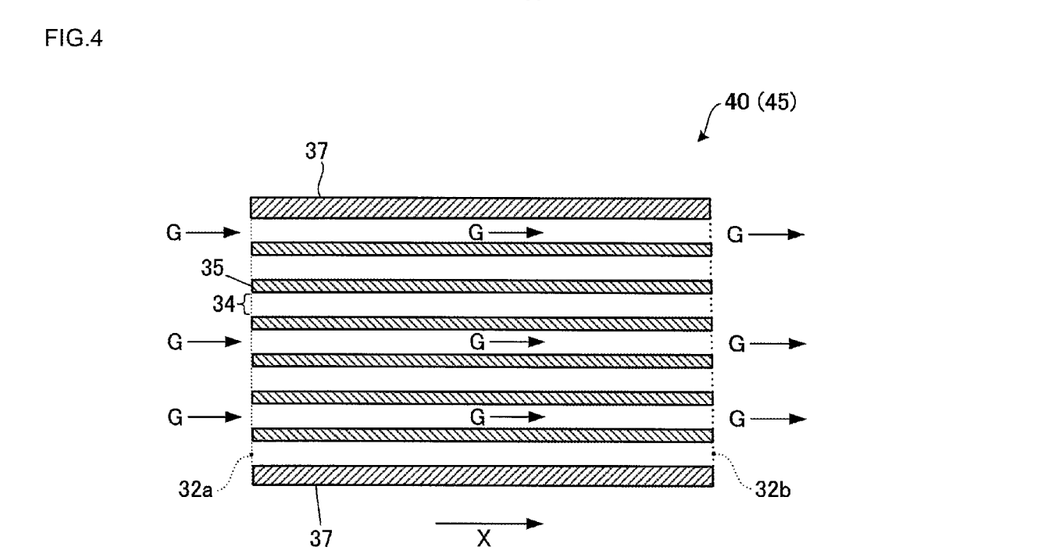
FIG. 4 is a schematic diagram of the B-B' cross section in FIG. 3.

FIG. 3 is a schematic perspective view of one concrete example of the honeycomb catalyst carrier 40. FIG. 4 is a schematic diagram of the B-B' cross section in FIG. 3. To describe with reference to these diagrams, the honeycomb catalyst carrier 40 includes: a plurality of cells 34 to be a flow passage of a fluid G; and partition walls 35 for defining and forming the cells 34. In the honeycomb catalyst carrier 40 illustrated in FIG. 3 and FIG. 4, the outer periphery portion is surrounded by circumferential walls 37. In the honeycomb catalyst carrier 40, in the case where the catalyst is loaded on the partition walls 35 to be used as a honeycomb catalytic body for purifying exhaust gas, usually, the partition wall 35 and the circumferential wall 37 are generally porous and mainly contain ceramic. Here, the expression "mainly contain ceramic" in this description means the case where the content of ceramic is 50 mass % or more.

As illustrated in FIG. 3, in this honeycomb catalyst carrier 40, usually, the marking base 1 is disposed on the surface of the circumferential wall 37.

When the catalyst is loaded on the honeycomb catalyst carrier 40, a catalyst slurry in which the catalyst is dispersed was poured in the cell 34 so as to perform the process for causing the catalyst to adhere to the partition wall 35. Here, in the case where the partition wall 35 and the circumferential wall 37 of the honeycomb catalyst carrier 40 are porous and mainly contains ceramic, the catalyst might leak onto the surface of the circumferential wall 37. Accordingly, in the case where the marking base 1 of the one embodiment of the present invention described is disposed on the surface of the circumferential wall 37, the catalyst is accumulated within the bubble-like pore 10 near the contact surface with the circumferential wall 37. In the case where the marking base 1 of the one embodiment of the present invention is disposed on the surface of the circumferential wall 37, this allows reducing the situation where the catalyst leaks to the surface of the display of the marking base 1. Thus, after the catalyst slurry is poured, drying and then firing can be performed so as to obtain a honeycomb catalytic body 45 having the partition wall 35 on which the catalyst is loaded.

To describe with reference to FIG. 4, in the honeycomb catalytic body 45, when a gas G is allowed to flow into the cell 34 from an inflow-side end face 32*a*, the gas G can be purified by a catalytic reaction due to the catalyst loaded on the surface of the partition wall 35 so as to discharge the gas G cleaner than that at the time of inflow, from the discharge-side end face 32*b*.

Figure 5:
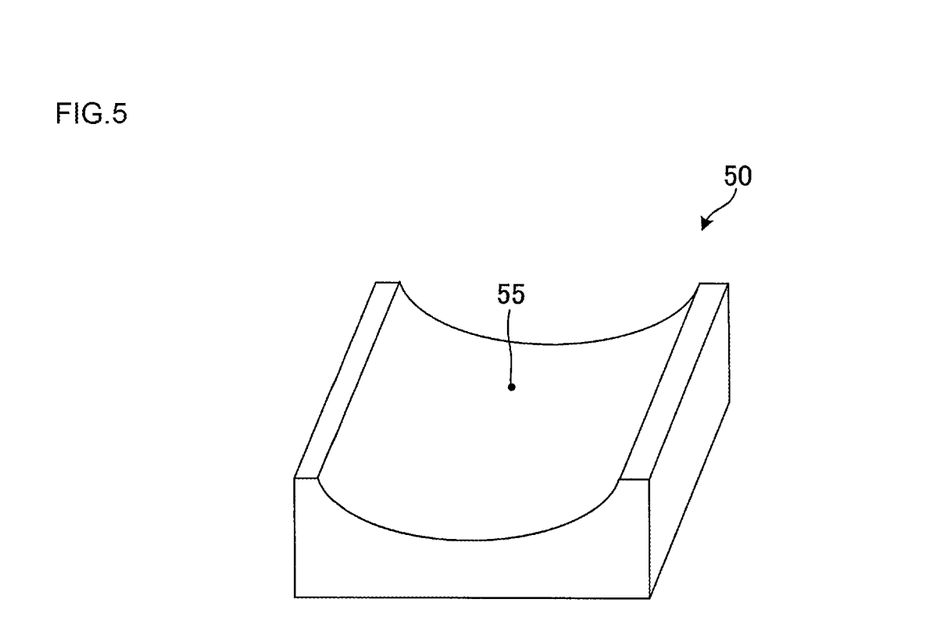
FIG. 5 is a schematic explanatory diagram of one concrete example of an applicator used for application of the marking base composition of the present invention.

FIG. 5 is a schematic diagram illustrating one example of an applicator 50 used when a marking base composition 60 is applied over the surface of the honeycomb catalyst carrier 40. As illustrated in the drawing, a part of the surface of the applicator 50 is depressed to have an approximately mutually complementary relationship with the shape of the circumferential wall 37 of the honeycomb catalyst carrier 40. The depressed region on the surface of the applicator 50 is used as a transfer region 55.

Figure 6:
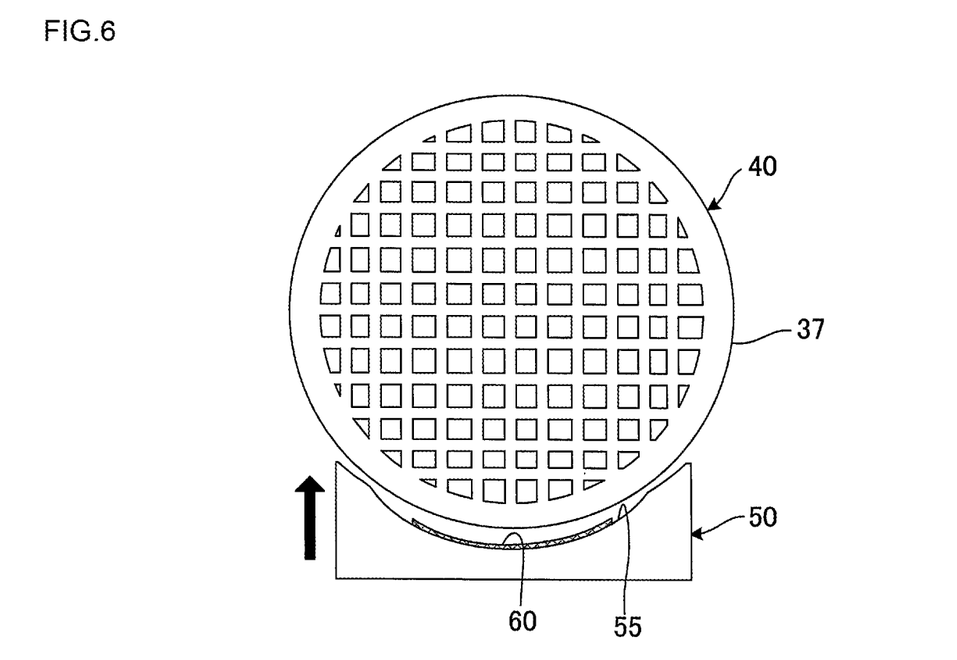
FIG. 6 is a schematic explanatory diagram of one concrete example when the marking base composition of the present invention is applied.

FIG. 6 is a schematic diagram illustrating one embodiment of a method for applying the marking base composition using the applicator 50 illustrated in FIG. 5. To describe with reference to FIG. 6, the application method of this embodiment includes a first process and a second process. In the first process, the coated film 60 of the marking base composition is formed in the transfer region 55 on the surface of the applicator 50. In the second process, the transfer region 55 of the applicator 50 is brought into contact with the surface of the circumferential wall 37 of a honeycomb structure so as to transfer the coated film 60 onto the surface of the circumferential wall 37. Accordingly, a sheet application layer including the marking base composition is disposed on the surface of the circumferential wall 37.

In this embodiment, subsequently, heat treatment is performed on the honeycomb catalyst carrier 40 at 300 to 800° C. for 2 seconds to 30 minutes. This heat treatment causes volatilization of the organic liquid medium and the organic binder and burning out of the thermal expansion resin so as to cause the inorganic binder to bond the inorganic particles with one another and adhere to the object. This results in the marking base 1 that allows marking with ink.

EXAMPLES

Hereinafter, the present invention will be described in more detail on the basis of examples, but the present invention is not limited to these examples.

(1) Preparation of Marking Base Composition:

Examples 1 to 13 and Comparative Examples 1 to 13

With the combination illustrated in Table 1, inorganic particles, an inorganic binder, an organic binder, a thermal expansion resin, a pore former, and an organic solvent were blended together in a mixture, so as to prepare the marking base composition (the units of the numerical values illustrated in Table 1 are mass % and the display of "–" means that the material is not contained, that is, shows 0 mass %. Titania illustrated in Table 1 is inorganic particles belonging to the inorganic particle for laser color development.

TABLE 1

| | Inorganic Particle | | | | Inorganic Binder | | | Organic Binder Acrylic Resin | Thermal Expansion Resin Unfoamed Foamable Resin | Pore Former | | | Organic Solvent |
| | | | | | Titanium Based Ceramic Resin | Silicon Resin | Sum | | | Polymethyl metaacrylate | Water-absorbing Resin | Tapioca | |
| | Titania | Kaolin | Mica | Sum | | | | | | | | | |
|---|---|---|---|---|---|---|---|---|---|---|---|---|---|
| Example 1 | 20.8 | 16.8 | 3.0 | 40.6 | 5.0 | — | 5.0 | 15.0 | 2.0 | — | — | — | 37.4 |
| Example 2 | 18.8 | 17.7 | 3.2 | 39.7 | 15.9 | — | 15.9 | 5.3 | 1.8 | — | — | — | 37.3 |
| Example 3 | 18.7 | 17.6 | 3.2 | 39.5 | 5.3 | — | 5.3 | 15.8 | 2.1 | — | — | — | 37.3 |
| Example 4 | 18.7 | 17.6 | 3.2 | 39.5 | 10.6 | — | 10.6 | 10.6 | 2.1 | — | — | — | 37.2 |
| Example 5 | 18.7 | 17.6 | 3.2 | 39.5 | 15.8 | — | 15.8 | 5.3 | 2.1 | — | — | — | 37.3 |
| Example 6 | 18.3 | 17.2 | 3.2 | 38.7 | 15.5 | — | 15.5 | 6.4 | 2.2 | — | — | — | 37.2 |
| Example 7 | 17.7 | 16.7 | 3.0 | 37.4 | 15.0 | — | 15.0 | 7.4 | 2.1 | — | — | — | 38.1 |
| Example 8 | 17.2 | 16.1 | 2.9 | 36.2 | 14.5 | — | 14.5 | 8.3 | 2.8 | — | — | — | 38.2 |
| Example 9 | 19.3 | 19.3 | 2.8 | 41.4 | 13.8 | — | 13.8 | 5.5 | 2.2 | — | — | — | 37.1 |
| Example 10 | 16.9 | 16.9 | 2.8 | 36.6 | 16.9 | — | 16.9 | 4.0 | 2.3 | — | — | — | 40.2 |
| Example 11 | 18.7 | 17.6 | 3.2 | 39.5 | 13.8 | — | 13.8 | 7.3 | 2.1 | — | — | — | 37.3 |
| Example 12 | 18.7 | 15.6 | 3.2 | 37.5 | 17.8 | — | 17.8 | 5.3 | 2.1 | — | — | — | 37.3 |
| Example 13 | 18.7 | 13.6 | 3.2 | 35.5 | 19.8 | — | 19.8 | 5.3 | 2.1 | — | — | — | 37.3 |
| Comp.Ex 1 | 17.8 | 16.8 | 3.0 | 37.6 | 25.0 | — | 25.0 | — | — | — | — | — | 37.4 |
| Comp.Ex 2 | 35.6 | — | 3.0 | 38.6 | 24.0 | — | 24.0 | — | — | — | — | — | 37.4 |
| Comp.Ex 3 | 17.8 | 6.8 | 3.0 | 27.6 | 25.0 | — | 25.0 | — | — | — | — | 10.0 | 37.4 |
| Comp.Ex 4 | 17.8 | 1.8 | 3.0 | 22.6 | 25.0 | — | 25.0 | — | — | — | — | 15.0 | 37.4 |
| Comp.Ex 5 | 17.8 | 6.8 | 3.0 | 27.6 | 25.0 | — | 25.0 | — | — | — | 10.0 | — | 37.4 |
| Comp.Ex 6 | 17.8 | — | 3.0 | 20.8 | 25.0 | — | 25.0 | — | — | — | 16.8 | — | 37.4 |
| Comp.Ex 7 | 17.8 | 6.8 | 3.0 | 27.6 | 25.0 | — | 25.0 | — | — | 10.0 | — | — | 37.4 |
| Comp.Ex 8 | 17.8 | — | 3.0 | 20.8 | 25.0 | — | 25.0 | — | — | 16.8 | — | — | 37.4 |
| Comp.Ex 9 | 17.8 | 15.8 | 3.0 | 36.6 | 25.0 | — | 25.0 | — | 1.0 | — | — | — | 37.4 |
| Comp.Ex 10 | 17.8 | 14.8 | 3.0 | 35.6 | 25.0 | — | 25.0 | — | 2.0 | — | — | — | 37.4 |
| Comp.Ex 11 | 18.7 | 17.6 | 3.2 | 39.5 | 21.1 | — | 21.1 | — | 2.1 | — | — | — | 37.3 |
| Comp.Ex 12 | 17.8 | 11 | 3.0 | 31.8 | 25.0 | — | 25.0 | 5.8 | — | — | — | — | 37.4 |
| Comp.Ex 13 | 17.8 | 16.8 | 3.0 | 37.6 | — | 25.0 | 25.0 | — | — | — | — | — | 37.4 |

The marking base compositions of the examples 1 to 13 and the comparative examples 1 to 13 were superficially printed on (applied over) the circumferential wall of the porous ceramic honeycomb catalyst carrier using a pad printing machine made by NAVITAS Co., LTD. [what is called a print layer (application layer) was disposed]. Subsequently, a marking base was provided by performing heat treatment at 700 to 800° C. for 2 to 5 seconds.

(2) Printing with Ink:

On the marking base, a predetermined barcode was printed with ink using a piezoelectric inkjet device. The barcode was read using a barcode reader made by SICK AG. Here, printing with ink was performed both before the catalyst was loaded and after the catalyst was loaded below, respectively.

(3) Printing with Laser:

On the marking base, a predetermined barcode was printed using a $CO_2$ laser printer. The barcode was read using a barcode reader made by SICK AG. Here, printing with laser was performed before the catalyst was loaded below.

(4) Loading of Catalyst:

A catalyst slurry was poured in the cell of the honeycomb catalyst carrier. Subsequently, the catalyst slurry poured in the cell is discharged and drying and heat treatment (at 500° C. and for 0.5 hour) were performed so as to obtain a honeycomb catalytic body. Here, when the catalyst slurry was poured, the existence of leakage of the catalyst slurry was observed on the printed surface of the marking base.

(5) Heat-Resistance Test:

The honeycomb catalytic body was still placed under the environment at 600° C. for 3 hours.

(6) Evaluation:

For the marking base compositions (or a part of them) of the examples 1 to 13 and the comparative examples 1 to 13, the following "open pore diameter", "pore area ratio", "printing transferability", "ink printability", "laser printability", "thermal resistance", and "appearance" were evaluated (whose result is illustrated in Table 2). Here, in Table 2, a part illustrated as "—" means that data was not acquired.

[Open Pore Diameter]

The "average diameter of the open pore" was obtained by performing shape analysis from an electron micrograph of the base surface in a visual filed of 0.1 $mm^2$ or more, binarizing so as to measure the area of each pore, and calculating the average value of the diameter of the circle having the area equal to the area of each pore. That is, the average diameter of the open pore was set to the average value of the diameter of the circle having the same area as the area of each pore on the base surface.

[Pore Area Ratio]

The "pore area ratio" was calculated as the proportion (on percentage) of the area occupied by the pore having a pore diameter of than 4 μm or more on the base surface (the sum of the area of the pore having the pore diameter of 4 μm or more on the base surface/the area of the base surface×100).

[Printing Transferability]

The case where the print layer (application layer) of the marking base was able to be uniformly printed on (applied over) the entire surface of the circumferential wall of the honeycomb catalyst carrier was defined as "Good" (illustrated with a circle mark in Table 2). The case where the print layer (application layer) of the marking base was not able to be uniformly printed on (applied over) the entire surface was defined as "Poor" (illustrated with a cross in Table 2).

[Ink Printability]

The case where the barcode was able to be accurately read immediately after printing before the catalyst was loaded and after the catalyst was loaded and was able to be read even after the printed portion of the marking base was rubbed was defined as "Good" (illustrated with a circle mark in Table 2). The case where the barcode was able to be accurately read immediately after printing but was not able to be read after the printed portion of the marking base was rubbed was defined as "Poor" (illustrated with a triangle mark in Table 2). The case where the barcode was not able

TABLE 2

|  | Average Diameter of Open Pore (μm) | Pore Area Ratio (%) | Printing Transferability | Printing before Catalyst is Loaded Ink Printability | Printing after Catalyst is Loaded | | Thermal Resistance | Appearance |
|---|---|---|---|---|---|---|---|---|
|  |  |  |  |  | Ink Printability | Laser Printability |  |  |
| Example 1 | — | — | ○ | ○ | ○ | ○ | ○ | ○ |
| Example 2 | 20.3 | 11.2 | ○ | ○ | ○ | ○ | ○ | ○ |
| Example 3 | 25.2 | 15.3 | ○ | ○ | ○ | ○ | ○ | ○ |
| Example 4 | 22.2 | 10.4 | ○ | ○ | ○ | ○ | ○ | ○ |
| Example 5 | 15.3 | 8.4 | ○ | ○ | ○ | ○ | ○ | ○ |
| Example 6 | — | — | ○ | ○ | ○ | ○ | ○ | ○ |
| Example 7 | — | — | ○ | ○ | ○ | ○ | ○ | ○ |
| Example 8 | — | — | ○ | ○ | ○ | ○ | ○ | ○ |
| Example 9 | — | — | ○ | ○ | ○ | ○ | ○ | ○ |
| Example 10 | — | — | ○ | ○ | ○ | ○ | ○ | ○ |
| Example 11 | — | — | ○ | ○ | ○ | ○ | ○ | ○ |
| Example 12 | — | — | ○ | ○ | ○ | ○ | ○ | ○ |
| Example 13 | — | — | ○ | ○ | ○ | ○ | ○ | ○ |
| Comp.Ex 1 | 17.4 | 5.1 | ○ | x | x | ○ | ○ | ○ |
| Comp.Ex 2 | 10.0 | 2.2 | ○ | x | x | ○ | ○ | ○ |
| Comp.Ex 3 | — | — | ○ | ○ | Δ | ○ | ○ | ○ |
| Comp.Ex 4 | — | — | ○ | ○ | Δ | ○ | ○ | x |
| Comp.Ex 5 | — | — | ○ | ○ | Δ | ○ | ○ | x |
| Comp.Ex 6 | — | — | ○ | ○ | ○ | ○ | ○ | x |
| Comp.Ex 7 | — | — | x | ○ | Δ | ○ | ○ | ○ |
| Comp.Ex 8 | — | — | x | ○ | ○ | ○ | x | ○ |
| Comp.Ex 9 | — | — | ○ | Δ | Δ | ○ | ○ | ○ |
| Comp.Ex 10 | — | — | ○ | Δ | Δ | ○ | ○ | ○ |
| Comp.Ex 11 | — | — | ○ | Δ | Δ | ○ | ○ | ○ |
| Comp.Ex 12 | — | — | ○ | x | x | ○ | ○ | ○ |
| Comp.Ex 13 | — | — | ○ | x | x | ○ | ○ | ○ | to be accurately read even immediately after printing was defined as "Poor (−)" (illustrated with a cross in Table 2).

[Laser Printability]

The case where the barcode was able to be accurately read was defined as "Good" (illustrated with a circle mark in Table 2). The case where the barcode was not able to be accurately read was defined as "Poor" (illustrated with a cross in Table 2).

[Thermal Resistance]

After the above-described heat-resistance test, the case where the barcode by printing with ink was able to be accurately read was defined as "Good" (illustrated with a circle mark in Table 2). The case where the barcode was not able to be accurately read was defined as "Poor" (illustrated with a cross in Table 2).

[Appearance]

The marking base composition was superficially printed (applied over) the circumferential wall of the honeycomb catalyst carrier, and heat treatment was performed at 700 to 800° C. for 2 to 5 seconds. Subsequently, it was observed whether or not the marking base was discolored into black due to burning. The case where the black discoloration did not occur was defined as "Good" (illustrated with a circle mark in Table 2). The case where the black discoloration occurred was defined as "Poor" (illustrated with a cross in Table 2).

In the examples 1 to 13, all of the printing transferability, the ink printability, the thermal resistance, the laser printability, and the appearance were "Good." In contrast, in the comparative examples 1 to 13, at least one of the above-described evaluation items was "Poor." In particular, according to the comparison between the examples 1 to 13 and the comparative examples 9 to 12, it is found that including the organic binder and the thermal expansion resin together in the marking base composition allowed achieving excellent ink printability.

The present invention is available to a marking base composition for display (marking) with ink and a marking base using this marking base composition.

INDUSTRIAL APPLICABILITY

The present invention is available to a marking base composition for display (marking) with ink and a marking base using this marking base composition.

DESCRIPTION OF REFERENCE NUMERALS

1: marking base, 5: object, 7: pore, 10: bubble-like pore, 15: communication pore, 20: ink, 32a: inflow-side end face, 32b: discharge-side end face, 34: cell, 35: partition wall, 37: circumferential wall, 40: honeycomb catalyst carrier, 45: honeycomb catalytic body, 50: applicator, 55: transfer region, 60: coated film

The invention claimed is:

1. A marking base composition, comprising:
   inorganic particles of 27 to 50 mass %;
   an inorganic binder of 5 to 20 mass %;
   an organic binder of 3 to 16 mass %;
   a thermal expansion resin of 1 to 3 mass %; and
   an organic solvent, wherein the thermal expansion resin is a foamable resin in an unfoamed state.

2. The marking base composition according to claim 1, wherein the inorganic particles include particles for laser color development of 12 to 25 mass % based on the entire marking base composition being 100 mass %.

3. The marking base composition according to claim 2, further comprising a thickening material of 0.5 to 1.0 mass %.

4. The marking base composition according to claim 1, further comprising a thickening material of 0.5 to 1.0 mass %.

5. A marking base obtained by:
   forming the marking base composition according to claim 1 in a sheet formation; and
   performing heat treatment at 300 to 800° C. for 2 seconds to 30 minutes.

6. The marking base according to claim 5, wherein a thickness of the marking base is 10 to 100 μm.

7. A marking base, comprising:
   inorganic particles of 27 to 50 mass % containing at least one kind of mica, silica, talc, and kaolin; and
   an inorganic binder of 15 to 25 mass %, wherein
   the inorganic particles are combined together via the inorganic binder,
   an average diameter of an open pore on a base surface is 15 to 26 μM and a pore area ratio is 8 to 16%, and
   wherein the inorganic particles include inorganic particles for laser color development of 32 to 46 mass % based on the entire marking base composition being 100 mass %.

8. The marking base according to claim 7, wherein a thickness of the marking base is 10 to 100 μm.

* * * * *